United States Patent [19]

Morgan

[11] Patent Number: 4,917,438
[45] Date of Patent: Apr. 17, 1990

[54] ADJUSTABLE-WIDTH SEATING FOR PASSENGER-CARRYING VEHICLES

[75] Inventor: Arthur Morgan, St. Albans, England

[73] Assignee: Flight Equipment & Engineering Limited, Buckinghamshire, United Kingdom

[21] Appl. No.: 197,954

[22] Filed: May 24, 1988

[30] Foreign Application Priority Data

Jun. 1, 1987 [GB] United Kingdom ............... 8712844

[51] Int. Cl.$^4$ .............................................. A47C 7/54
[52] U.S. Cl. .................................. 297/411; 297/116; 297/232; 297/412
[58] Field of Search ............... 297/412, 417, 411, 118, 297/232, 115, 116; 244/118.6; 296/64, 65.1

[56] References Cited

U.S. PATENT DOCUMENTS

| | | | |
|---|---|---|---|
| 2,781,828 | 2/1957 | Ferrar | 297/412 |
| 3,063,752 | 11/1962 | Moore | 297/411 |
| 3,586,374 | 6/1971 | Laessker | 297/421 |
| 3,926,473 | 12/1975 | Hogan | 297/115 |
| 4,533,175 | 8/1985 | Brennan | 297/232 |

FOREIGN PATENT DOCUMENTS

| | | |
|---|---|---|
| 0005556 | 12/1979 | European Pat. Off. . |
| 3110050 | 9/1982 | Fed. Rep. of Germany ...... 297/412 |
| 1037972 | 8/1966 | United Kingdom . |
| 1323861 | 7/1973 | United Kingdom . |

*Primary Examiner*—James T. McCall
*Attorney, Agent, or Firm*—Watson, Cole, Grindle & Watson

[57] ABSTRACT

An adjustable-width seating unit for a passenger-carrying vehicle has a pillar pivotally connected to its support frame to swing about a first axis substantially longitudinally disposed with respect to the seating unit, an armrest mounted on the pillar and rotatable relative to the pillar about a second axis, fixed relative to the pillar and substantially longitudinally disposed with respect to the seating unit. On swinging the pillar about the first axis the armrest may be moved between laterally-spaced positions and by rotating the armrest about the second axis its angular disposition relative to the seating unit may be maintained.

A detent adjacent to the pivotal connection of the pillar to the frame locates the pillar positively but releasably in its respective positions and a detent adjacent to the rotational mounting of the armrest similarly locates the armrest in different angular positions relative to the pillar. The arrangement can be such that both detents may be released in a single action.

An adjustable-width seating unit may have at least two such armrests, spaced apart laterally to define a seat between them, the width of which can be varied by moving at least one of the armrests between laterally-spaced positions.

If a back support part of the seating unit is reclinable, with the usual locking means for fixing it in any desired angular position with respect to the support frame, a device may be included for de-activating the locking means in a selected position of the pillar.

14 Claims, 5 Drawing Sheets

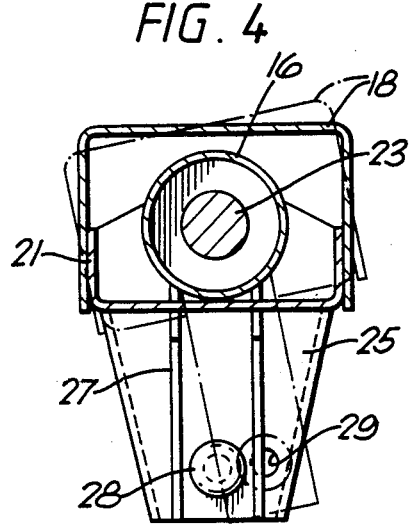
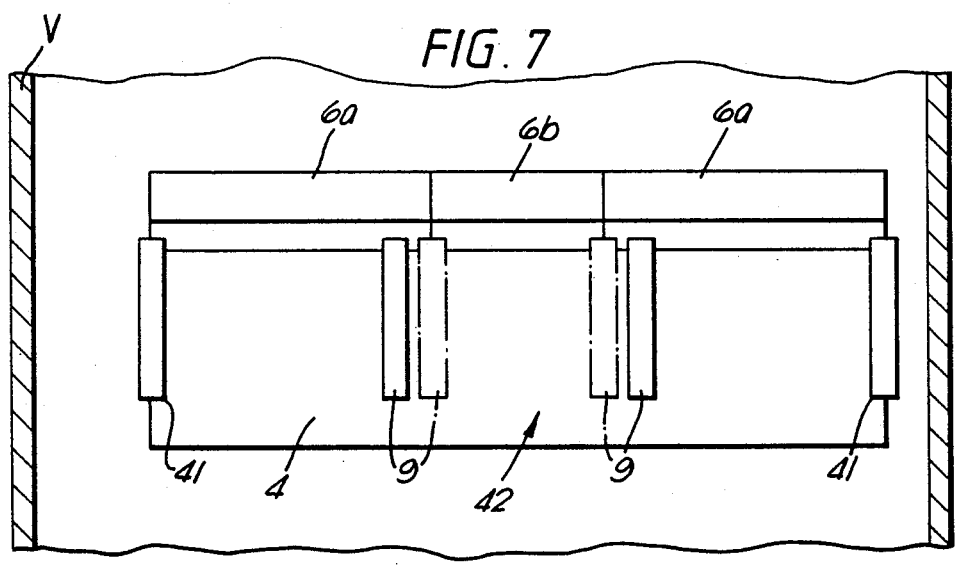

4,917,438

ADJUSTABLE-WIDTH SEATING FOR PASSENGER-CARRYING VEHICLES

BACKGROUND OF THE INVENTION

1. Field of the Invention

In passenger-carrying vehicles (aircraft, ships and land vehicles), particularly in aircraft, it is usual to provide seats of different widths for passengers travelling on different classes of fare. For example, a seat for a passenger travelling on the "First Class" fare is usually wider than one provided for passengers travelling on the "Tourist Class" fare.

Vehicles are commonly used to carry passengers travelling on different class fares on different journeys. The number of passengers in each class is likely to vary from one journey to another. It is therefore common to provide adjustable-width seating, with armrests which are laterally movable so that they can define seats of different widths on different journeys. There are, for example, seating units known as "Convertibles", of width sufficient for three narrower seats abreast for one class of passenger, with fixed armrests at the sides and two intermediate armrests, each of which can be placed selectively in two laterally-spaced positions. In the first positions they are equally spaced from each other and from the fixed armrests to define and separate the three narrower seats, and in the second positions they are closer together so as to define with the fixed armrests two wider seats abreast with a space between them. "Convertible" seating units are described for example in British Patent Specification No. 1,037,972 and in U.S. Pat. No. 4,533,175.

"Convertibles" are of course restricted to use in vehicles in which seating units providing three narrower seats abreast are required, but there is a demand of adjustable-width seating providing different numbers of seats abreast. The number of seats may not be required to be changed when the armrests are moved between their different positions. For example, a vehicle may be of such width that seating units providing two seats abreast are required, with facilities for adjusting the width of the seats, either to accommodate different classes of passenger as mentioned or in order to improve comfort for passengers of different sizes.

This invention concerns armrest arrangements for "Convertibles" and other adjustable-width seating.

2. Description of the Related Art

It is known, for example from U.S. Pat. No. 3,586,374, European Patent Application No. 0 005 556 and British Patent Specification No. 1 323 861, to make chairs with armrests mounted on rotatable pillars or arms so that they may be adjusted laterally to vary the effective width of the chairs. U.S. Pat. No. 3,926,473 discloses an adjustable type of armrest unit in which a pair of movable armrest sections have upper cap sections which move arcuately in and out from armrest support framing that is positioned between adjacent seats in a multiple seat arrangement.

SUMMARY OF THE INVENTION

According to this invention an adjustable-width seating unit comprises a back support and a bottom part, mounted substantially at right angles on a support frame, a pillar pivotally connected to the support frame to swing about a first axis substantially longitudinally disposed with respect to the seating unit, an armrest mounted on the pillar remote from the pivotal connection and rotatable relative to the pillar about a second axis which is fixed relative to the pillar and substantially longitudinally disposed with respect to the seating unit, whereby on swinging the pillar about the first axis the armrest may be moved between laterally-spaced positions and by rotating the armrest about the second axis its angular disposition relative to the seating unit may be maintained, characterised by first releasable detent means adjacent to the pivotal connection between the pillar and the support frame for locating the pillar in pre-determined positions angularly spaced about the first axis and second releasable detent means adjacent to the mounting of the armrest on the pillar for locating the armrest in predetermined positions angularly spaced about the second axis, the angular spacings about the first and second axes being substantially equal, whereby on swinging the pillar about the first axis between its pre-determined positions the armrest may be moved between laterally-spaced positions and by rotating the armrest about the second axis between its pre-determined positions its angular disposition relative to the seating unit will substantially be maintained.

A preferred first releasable detent means is a spring-loaded element on the pillar engaging a complementary recess in the support frame.

At least two armrests will usually be provided on a seating unit, to define a seat between them. One or both of the armrests may be laterally-movable as described, according to the amount of variation required in the width of the seat so defined. A seating unit for a row of seats abreast will have several armrests to define and separate the seats. An adjustable-width seating unit of the "Convertible" type, providing either three narrower seats or two wider seats, will have an armrest at each side, probably fixed, and two intermediate armrests which are laterally movable between predetermined laterally-spaced positions as described.

BRIEF DESCRIPTION OF THE DRAWINGS

Embodiments of the invention are illustrated by way of example by the accompanying drawings in which:

FIG. 4 is a sectional view on the line C-C of FIG. 1.

FIG. 7 is a diagrammatic plan of an adjustable-width seating unit according to the invention positioned in a passenger-carrying vehicle.

DESCRIPTION OF THE PREFERRED EMBODIMENTS

Figure 1:
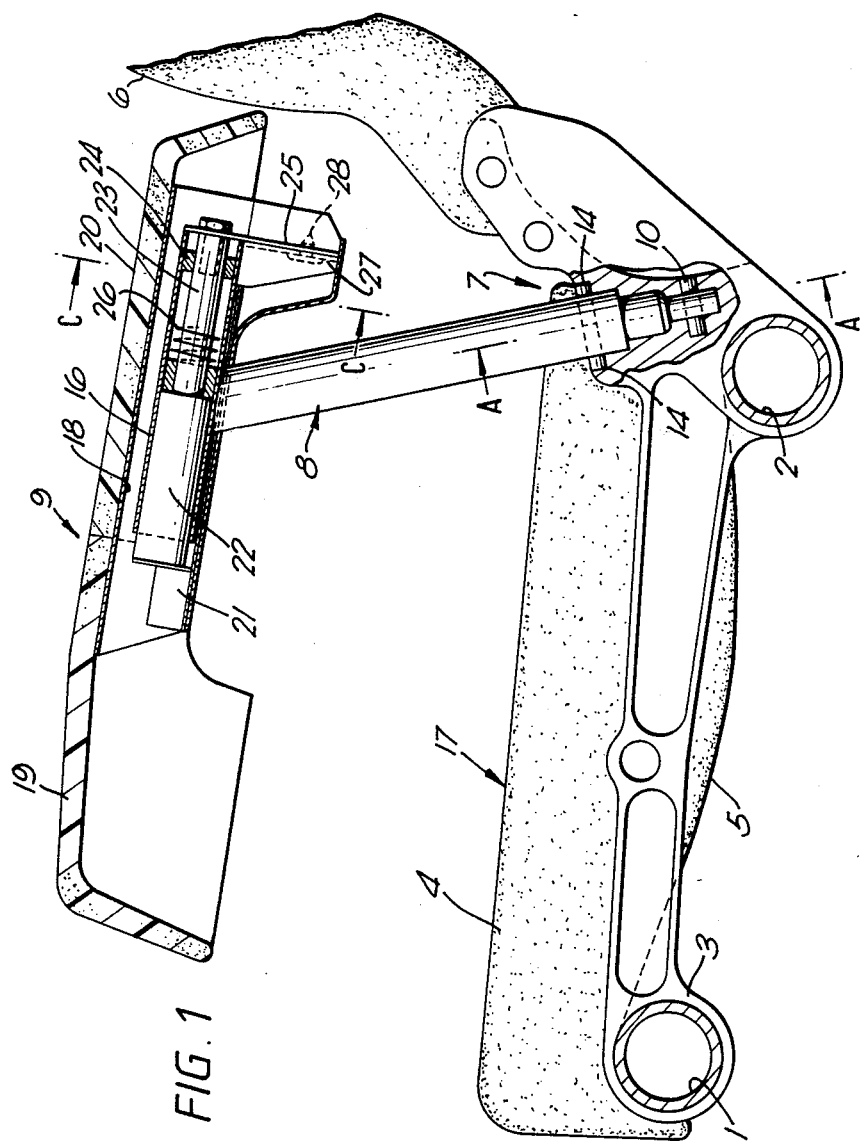
FIG. 1 is a sectional side elevation of an adjustable-width seating unit, including one laterally-movable armrest.
Figure 2:
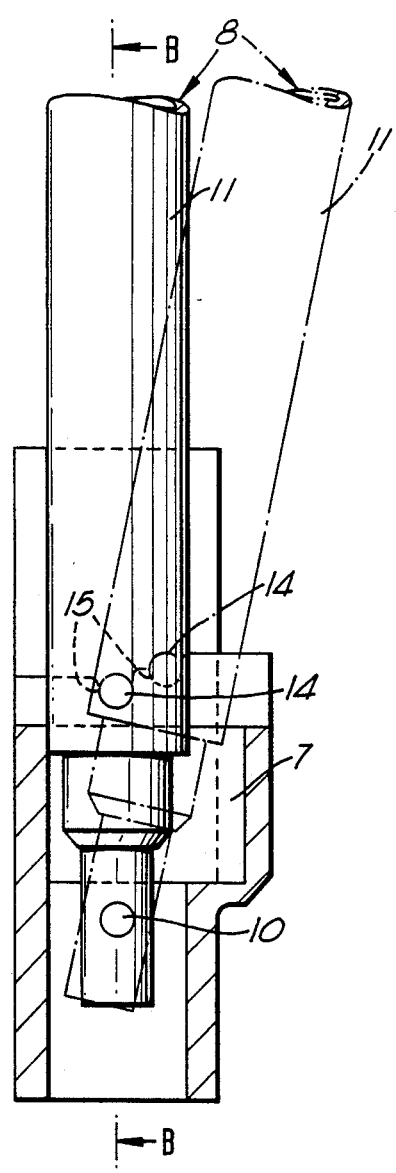
FIG. 2 is a sectional view on the line A-A of FIG. 1.
Figure 3:
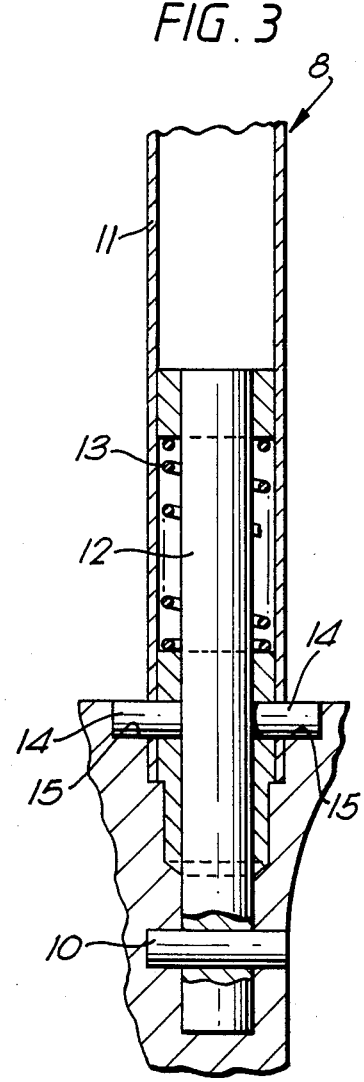
FIG. 3 is a sectional view on the line B-B of FIG. 2.

The adjustable-width seating unit shown in FIGS. 1 to 4 has a support frame of the usual kind, comprising two parallel transverse beams 1, 2 carrying two or more longitudinal members 3, one of which is shown in FIG. 1. An upholstered bottom part 4 rests on a pan 5 carried by the beams 1 and 2 and upholstered back support parts 6 are connected to the rear end of the longitudinal members, the seating surfaces of the bottom part and the back support parts being more or less at right angles in their normal positions as shown. Reclining arrangements may be included in the connection of the back support parts 6 to the longitudinal members 3, but are not illustrated.

A recess 7 is formed in the upper surface of the longitudinal member 3, near its rear end. A pillar 8 carrying an armrest 9 at its top end is connected at its bottom end to the longitudinal member 3 by means of a pivot pin 10 in this recess. The pivot pin 10 defines a first axis substantially longitudinally disposed with respect to the seating unit. The pillar 8 comprises an outer tubular element 11 slidably carried on an inner element 12, the lower end of which is mounted on the pivot pin 10. A compression spring 13 housed within the outer tubular element 11 and around the inner element 12 urges the outer tubular element 11 towards the pivot pin 10. Diametrically aligned detent pins 14 are mounted in the outer tubular element 11 and are urged by the spring 113 into engagement with the upper surface of the longitudinal member 33 at the transverse margins of the recess 7. Two spaced notches 15 are formed in each of these margins for receiving the detent pins 14 so as to locate the pillar in either of two positions, shown respectively in full lines and in chain-dotted lines in FIG. 2. From either of these positions, by pulling the outer tubular element 11 upwardly against the action of the spring 13, the detent pins 14 can be withdrawn from the relevant notches 15 and the pillar 8 can be swung about the pivot pin 10 into its alternative position and released to allow the detent pins 14 to engage the other notches 15.

Secured to the top end of the pillar 8 is a mounting tube 16 for the armrest 9, disposed longitudinally of the seating unit and substantially parallel to the seating surface 17 of the bottom part 4. Thus, by swinging the pillar about the first axis, the armrest is moved laterally between laterally-spaced positions in which it is releasably located by engagement of the detent pins 14 with the respective notches 15.

The axis of the mounting tube 16 is a second axis substantially longitudinally disposed with respect to the seating unit and fixed relative to the pillar. The armrest 9 comprises an inverted rectangular channel-section member 18 to which are secured shaped cap elements 19, 20. A bracket 21 secured inside the member 18 carries a pivot element 22 which fits snugly in the mounting tube 16 so that the armrest is rotatable about the mounting tube. A spindle 23 extends axially from the pivot element 22 through a bearing amount 24 in the mounting tube 16 and carries at its end a plate 25 which engages the end of the mounting tube 16 to retain the armrest. A compression spring 26 surrounds the spindle 23 to urge the plate 25 against the end of the mounting tube 16. An arm 27 extends radially downwardly from this end of the mounting tube 16 and carries a locating stud 28. The plate 25 has two holes 29 (see FIG. 4), angularly spaced about the axis of the rectangular tube 18, for receiving the locating stud 28 in either of two positions of the armrest, shown respectively in full lines and in chain dotted lines in FIG. 4. From either of these positions, the armrest 9 may be pushed rearwardly against the action of the spring 26 to disengage the respective holes 29 in the plate 25 from the stud 28. It can then be rotated to align the other hole with the stud and be released so that the stud enters the hole to locate the armrest in its other position. The angular spacing between the holes 29 about the axis of the tube 16 (the said second axis) is the same as the angular spacing between the two positions of the pillar 8 (as defined by the notches 15) about the axis of the pivot pin 10 (the said first axis) so that in either position of the pillar the armrest can have the same angular disposition with respect to the seating unit. The notches 15 are at different heights in the longitudinal member 3 to compensate for the angular movement of the pillar so as to locate the armrest at substantially the same height in each of its laterally-spaced positions.

Figure 5:
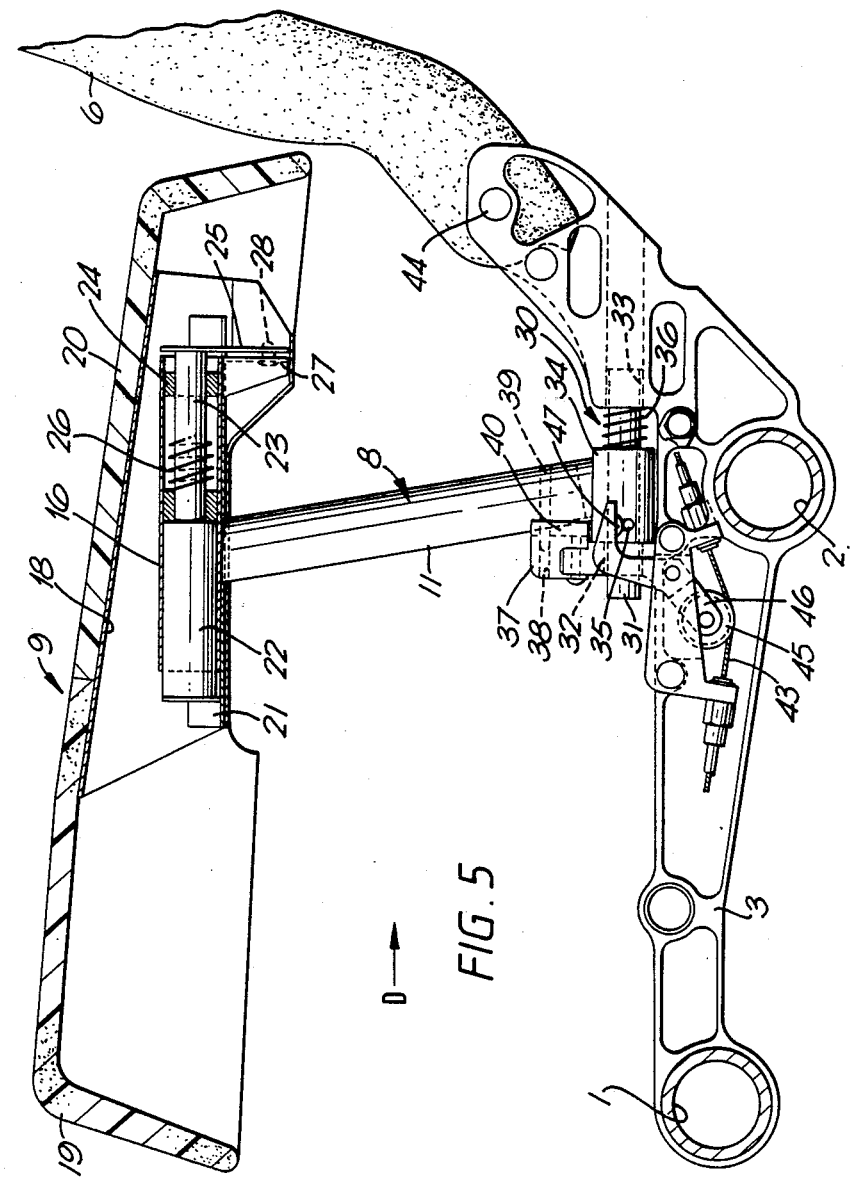
FIG. 5 is a sectional side elevation of another adjustable-width seating unit, including one laterally-movable armrest.
Figure 6:
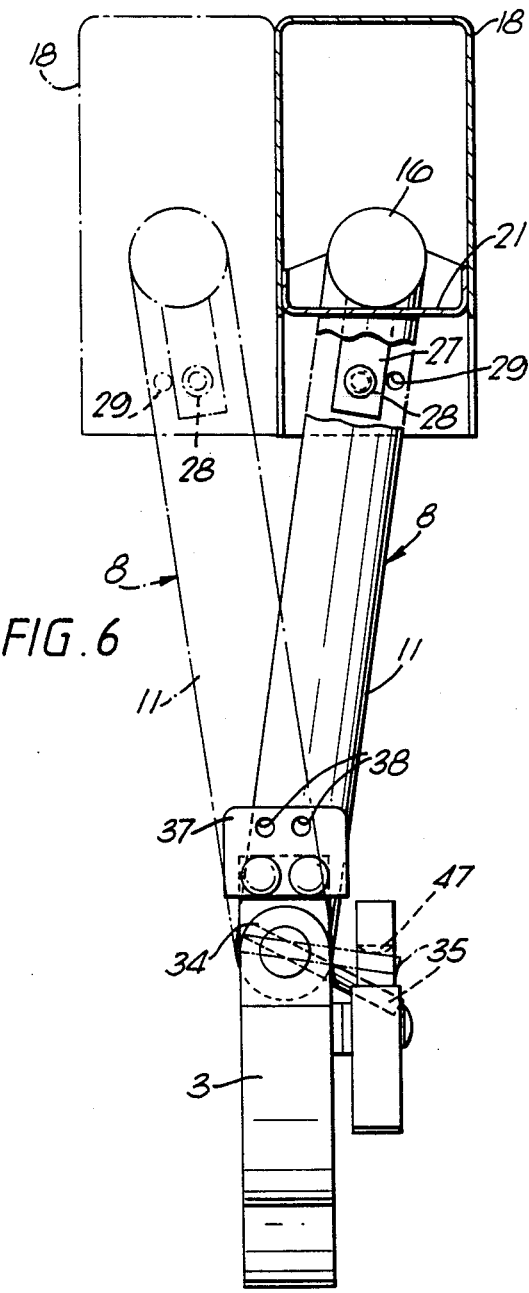
FIG. 6 is a sectional elevation viewed in the direction of arrow D of FIG. 5.

The embodiment shown in FIGS. 5 and 6 is generally similar in construction to that shown in FIGS. 1 to 4 and similar parts are indicated by the same reference numbers. The principle difference is in the pivotal connection of the pillar 8 to the longitudinal frame member 3. Instead of the recess 7, the longitudinal member 3 has a transverse groove 30 in which a pivot pin 31 is rotatably mounted in aligned bearings 32, 33 which define a first axis substantially longitudinally disposed with respect to the seating unit. The bottom end of the pillar 8 is secured to a sleeve 34 fitted over the pivot pin 31 and secured to it by a pin 35. Thus the pillar 8 can swing about the bearings 32, 33. The sleeve 34 is somewhat shorter than the width of the groove 30 and the assembly of pin and sleeve is urged forwardly in the groove 30 by a compression spring 36 surrounding the pin 31.

A locating boss is secured to the longitudinal member 3 at the forward end of the groove 30 and has two bores 38, parallel to that bearings 32, 33, for locating the pillar 8 in two angularly-spaced positions about the said first axis. A locating pin 39 is mounted in the pillar 8, parallel to the sleeve 34, and extends forwardly from the pillar in a position to engage respective bores 38 so as to locate the two angularly-spaced positions of the pillar. The locating pin 39 is urged towards the boss 37 and into either of the bores 38 by the spring 36. When it is desired to change the angular position of the pillar, it is necessary only to push it rearwardly with respect to the seating unit against the action of the spring 36, so as to disengage the locating pin 39 from one of the bores 38 and swing the pillar 8 about the bearings 32, 33 until the locating pin is aligned with the other bore 38, then, on releasing the rearward pressure, the spring 36 will cause the locating pin to enter the other bore 38. Inclined wings 40 on the locating boss 37 engage the pillar to restrict its angular movement and guide the locating pin 39 into the respective bores 38.

An armrest 9 is mounted on the top end of the pillar 8, the construction being much the same as described with reference to FIGS. 1 to 4. The mounting tube 16 for the armrest is substantially parallel to the sleeve 34 at the bottom end of the armrest so that the said first and second axes in this embodiment are substantially parallel.

This embodiment has the advantage over the previous embodiment that complete movement of the armrest 9 between its laterally-spaced positions can be performed in a single action. The springs 26 and 35 are of similar strength. Pushing the armrest 9 rearwardly to disengage a hole 29 from the stud 28, as described above with reference to FIGS. 1 and 4, will therefore cause simultaneous compression of both springs and disengagement of the locating pin 39 from a bore 38. Then, maintaining the angular position of the armrest 9 with respect to the seating unit, it can be moved laterally to its alternative position. On release of the rearward pressure the other hole 29 will engage the stud 28 and the locating pin 39 will engage the other bore 38. Another advantage of this embodiment, as illustrated by FIG. 6, is that the two positions of the pillar 8 are equally inclined to the vertical so that the armrest 9 is located at precisely the same height above the seating surface 17 (not shown in FIGS. 5 and 6) in both positions.

FIG. 7 shows an adjustable-width seating unit of the kind known as a "Convertible" which is mounted in a vehicle V and which provides either three narrower seats or two wider seats abreast. The seats are defined by fixed armrests 41 at the sides of the seating unit and two laterally-movable intermediate armrests 9. The intermediate armrests 9 are mounted on pillars 8 connected to spaced longitudinal members 3 of the frame of the seating unit as shown in FIGS. 1 to 4 or in FIGS. 5 and 6.

In the positions shown in full lines in FIG. 7 (and in FIGS. 2 and 6) the two intermediate armrests 9 define three narrower seats on the seating unit. When the pillars carrying the two intermediate armrests 9 are moved about their pivots to their other positions, shown in chain-dotted lines, each intermediate armrest 9 defines with the adjacent fixed armrest 41 a wider seat and there is a narrow space 42 between the intermediate armrests which is not used for seating or could be used to seat a child. There are two outer back support parts 6a of width corresponding to the wider seats and a narrower back support part 6b between them. Each of the outer back support parts 6a is pivotally connected to respective longitudinal frame members 3 so that it may be reclined independently of the other back support parts. However, when the intermediate armrests 9 are in their positions defining the narrower seats, each outer back support part 6a is shared between the middle seat and an outer seat. Reclining of the shared back support parts would be undesirable because it would inconvenience an occupant of the middle seat. To avoid such inconvenience, the embodiment of FIGS. 5 and 6 includes a device which is responsive to the position of the pillar 8 so as to de-activate the mechanism which controls the reclining of an adjacent back support part 6 when it is shared between adjacent seats.

The back support part 6 is held in its normal position as shown in the drawings or in a reclined position by known locking means (not shown) which is controlled by a cable 43 connected to a button (not shown) which is conveniently located on the seating unit for access by a passenger. Operating the button causes tension to be applied to the cable so as to release the locking means and enable the position of the back support part 6 to be adjusted about its pivotal connection 44 to the longitudinal member 3. This reclining facility is required to be operable only when the armrest 9 is in its position shown in chain-dotted lines. For this purpose, the cable 43 is passed under a tensioning pulley 45 carried by a bell-crank lever 46 which is pivotally mounted on the longitudinal member 3 adjacent to the groove 30. The pin 35 which secures the sleeve 34 to the pivot pin 31 is extended radially from the sleeve 34 so as to engage a cam follower 47 on the end of the bell-crank lever 46 remote from the pulley 45. When the armrest 9 is in its position shown in chain-dotted lines, this engagement holds the pulley 45 in the position shown in FIG. 5 so that the cable is sufficiently tensioned for the button to be operative as described. When the pillar 8 is swung to its alternative position, shown in full lines in FIGS. 6 and 7, the extension of the pin 35 swings down, allowing the pulley 45 to rise. This removes the tension from the cable 43 so that operation of the button has no effect on the locking means. Prior to moving the armrest from its position shown in chain-dotted lines, if the back support part 6 is in a reclined position, the button should be operated to release the locking means so that the back support part 6 can be moved to its normal position. Then, on release of the button and movement of the armrest 9 to its position shown in full lines, the back support part 6 will remain locked in that position, regardless of any operation of the button, until the armrest 9 is returned to its position shown in chain-dotted lines.

An adjustable width seating until may have more than two laterally-movable armrests, arranged in pairs, each pair defining a seat between them. If the movable armrests have two located positions, as in the described embodiments, a seat defined by two movable armrests has three possible widths. An adjustable-width seating unit providing two seats abreast may have two fixed armrests adjacent its centre, or a single fixed armrest, and movable armrests at its sides defining two seats with the fixed armrest or armrests.

Although the illustrated embodiments include only two located positions for the pillars and the intermediate armrests, more than two such positions could be provided by providing additional notches 15 or bores 38 and holes 29 if more than three widths of seat are required.

I claim:

1. An adjustable-width seating unit for use in a passenger-carrying vehicle, said adjustable-width seating unit comprising
   a support frame which is mountable in a vehicle,
   a back support part and a bottom part, mounted substantially at right angles on said support frame,
   a pillar having a pivotal connection to said support frame to swing about a first axis substantially longitudinally disposed with respect to the seating unit,
   an armrest mounted on said pillar remove from said pivotal connection and rotatable relative to said pillar about a second axis which is fixed relative to the pillar and substantially longitudinally disposed with respect to the seating unit,
   first releasable detent means adjacent to said pivotal connection for locating said pillar in pre-determined positions angularly spaced about said first axis and second releasable detent means adjacent to the mounting of said armrest on said pillar for locating said armrest in pre-determined positions angularly spaced about said second axis,
   the angular spacings of said pre-determined positions about said first and second axes being substantially equal,
whereby on swinging said pillar about said first axis between its said pre-determined positions said armrest may be moved between laterally-spaced positions and by rotating said armrest about said second axis between its said pre-determined positions its angular disposition relative to the seating unit will substantially be maintained.

2. An adjustable-width seating unit as claimed in claim 1 wherein said first releasable detent means is a spring-loaded element on said pillar engaging a complementary recess in said support frame.

3. An adjustable-width seating unit as claimed in claim 1 wherein said pivotal connection between said pillar and said support frame comprises a pivot pin mounted in said support frame in alignment with said first axis, said pillar being mounted on said pivot pin and movable along said first axis relative to said support frame, said first releasable detent means comprising complementary detent elements on said pillar and said support frame, selectively engageable in a direction parallel to said first axis when said pillar is in its said pre-determined positions, and first spring means urging said pillar along said first axis relative to said support frame in a direction to cause selective engagement between said detent elements, whereby engagement between said detent elements may be released by moving said pillar along said first axis against the action of said first spring means.

4. An adjustable-width seating unit as claimed in claim 3 wherein said first spring means urges said pillar along said first axis in a direction forwardly with respect to the seating unit.

5. An adjustable-width seating unit as claimed in claim 3 wherein said complementary detent elements are a pin and a part defining bores for receiving said pin, said bores being angularly spaced about said first axis to correspond with the desired angular spacing of said predetermined positions of said pillar.

6. An adjustable-width seating unit as claimed in claim 1 wherein said second releasable detent means comprises complementary detent elements on said armrest and said armrest and said pillar selectively engageable in a direction parallel to said second axis when said armrest is in its said predetermined positions and second spring means urging the armrest along said second axis relative to said pillar in a direction to cause selective engagement between said detent elements, whereby engagement between said detent elements may be released by moving said armrest alng said second axis against the action of said second spring means.

7. An adjustable width seating unit as claimed in claim 6 wherein said second spring means urges said armrest along said second axis in a direction forwardly with respect to the seating unit.

8. An adjustable-width seating unit as claimed in claim 6 wherein said complementary detent elements are a stud and a plate defining holes for receiving said stud, said holes being angularly spaced about said second axis to correspond with the desired angular spacing of said predetermined positions of said armrest.

9. An adjustable-width seating unit as claimed in claim 3 wherein said second releasable detent means comprises complementary detent elements on said armrest and said pillar selectively engageable in a direction parallel to said second axis when said armrest is in its said predetermined positions and second spring means urging the armrest along said second axis relative to said pillar in a direction to cause selective engagement between said detent elements, whereby engagement between said detent elements may be released by moving said armrest along said second axis against the action of said second spring means and wherein said first and second axes are substantially parallel and said first and second spring means are of similar strength and urge said pillar and said armrest in the same direction along said respective first and second axes, whereby movement of said armrest along said second axis against the action of said second spring means will also move said pillar along said first axis against the action of said first spring means so that said first and second releasable detent means may be released by a single action.

10. An adjustable-width seating unit as claimed in claim 1 including a second armrest, the two armrests defining a seat between them.

11. An adjustable-width seating unit as claimed in claim 10 in which said second armrest is fixed.

12. An adjustable-width seating unit as claimed in claim 10 in which said second armrest is laterally movable.

13. An adjustable-width seating unit as claimed in claim 1 including a pivotal connection between said back support part and said support frame so that said back support part may be reclined and means capable of actuation to permit said back support part to be moved about said pivotal connection relative to said support frame and a device, responsive to the position of said pillar, for de-activating said locking means so as to prevent movement of said back support part about said pivotal connection in a selected position of said pillar.

14. A passenger-carrying vehicle including an adjustable-width seating unit as claimed in claim 1.

* * * * *